United States Patent
Kwon et al.

(10) Patent No.: US 9,422,729 B2
(45) Date of Patent: Aug. 23, 2016

(54) CHIP-INLAID FLOORING MATERIAL USING PLA RESIN

(75) Inventors: Hyun-Jong Kwon, Ulsan (KR); Ji-Young Kim, Ulsan (KR); Ki-Bong Park, Seoul (KR); Chang-Won Kang, Cheongju-si (KR); Jun-Hyuk Kwon, Gunpo-si (KR); Sang-Sun Park, Cheongju-si (KR); Jang-Ki Kim, Cheongju-si (KR); Gyeong-Min Lee, Ulsan (KR); Cheng-Zhe Huang, Cheongju-si (KR)

(73) Assignee: LG HAUSYS, LTD., Seoul (KR)

( * ) Notice: Subject to any disclaimer, the term of this patent is extended or adjusted under 35 U.S.C. 154(b) by 50 days.

(21) Appl. No.: 13/978,498

(22) PCT Filed: Jun. 13, 2011

(86) PCT No.: PCT/KR2011/004316
§ 371 (c)(1),
(2), (4) Date: Jul. 5, 2013

(87) PCT Pub. No.: WO2012/173287
PCT Pub. Date: Dec. 20, 2012

(65) Prior Publication Data
US 2013/0302577 A1 Nov. 14, 2013

(51) Int. Cl.
*B32B 5/16* (2006.01)
*E04F 15/12* (2006.01)
(Continued)

(52) U.S. Cl.
CPC . *E04F 15/12* (2013.01); *B32B 5/16* (2013.01); *B32B 7/12* (2013.01); *B32B 27/12* (2013.01); *B32B 27/18* (2013.01); *B32B 27/36* (2013.01); *E04F 15/105* (2013.01);
(Continued)

(58) Field of Classification Search
CPC .......... B32B 5/26; B32B 15/08; B32B 27/12; B32B 27/00; A41D 27/06; D06P 1/44; D06P 5/001; B41M 5/5218; B41M 5/5254; B41M 7/0027; B41M 5/52; G03G 7/0013; G03G 7/0027; D06N 7/0028; B44F 7/00
USPC .......................................... 428/196, 204, 206
See application file for complete search history.

(56) References Cited

U.S. PATENT DOCUMENTS 3,759,742 A * 9/1973 Salamon .......................... 428/96
7,354,656 B2 * 4/2008 Mohanty et al. ............... 428/523
(Continued)

FOREIGN PATENT DOCUMENTS

CN 1906248 A 1/2007
EP 2144221 A1 1/2010
(Continued)

OTHER PUBLICATIONS

International Search Report mailed Feb. 29, 2012 for PCT/KR2011/004316.
(Continued)

*Primary Examiner* — Tahseen N Khan
(74) *Attorney, Agent, or Firm* — Hauptman Ham, LLP

(57) ABSTRACT

Disclosed herein is a chip inlaid flooring material using a PLA resin. The chip inlaid flooring material includes a chip inlaid layer, a dimension stabilizing layer, and a base layer, from the top of the flooring material, wherein at least one of the chip inlaid layer and the base layer includes polylactic acid (PLA) resin as a binder.

15 Claims, 5 Drawing Sheets

(51) Int. Cl.
*B32B 27/36* (2006.01)
*B32B 7/12* (2006.01)
*B32B 27/12* (2006.01)
*B32B 27/18* (2006.01)
*E04F 15/10* (2006.01)

(52) U.S. Cl.
CPC .......... *E04F 15/107* (2013.01); *B32B 2255/10* (2013.01); *B32B 2255/26* (2013.01); *B32B 2307/412* (2013.01); *B32B 2471/00* (2013.01); *Y10T 428/2481* (2015.01); *Y10T 428/24876* (2015.01); *Y10T 428/24893* (2015.01)

(56) References Cited

U.S. PATENT DOCUMENTS

| | | | |
|---|---|---|---|
| 2009/0148715 A1* | 6/2009 | Lee | 428/480 |
| 2010/0009175 A1 | 1/2010 | Lee et al. | |
| 2010/0015420 A1* | 1/2010 | Riebel et al. | 428/203 |
| 2012/0094109 A1* | 4/2012 | Komatsu | B29C 45/0013 428/316.6 |
| 2012/0128946 A1* | 5/2012 | Kwon | B32B 5/02 428/195.1 |

FOREIGN PATENT DOCUMENTS

| | | |
|---|---|---|
| EP | 2554370 A2 | 2/2013 |
| JP | 8-118577 A | 5/1996 |
| KR | 1007947912 | 5/2007 |
| KR | 1020080064392 | 7/2008 |
| KR | 1020100006055 | 1/2010 |
| KR | 1020110003503 | 1/2011 |
| WO | 2009/120311 A2 | 10/2009 |
| WO | 2011001791 A1 | 1/2011 |
| WO | WO2011001791 A1 * | 1/2011 |
| WO | 2011037325 A2 | 3/2011 |
| WO | WO2011037325 A2 * | 3/2011 |

OTHER PUBLICATIONS

Chinese Office Action dated Sep. 23, 2014.
Yang Bin, Green Plastic-Polylactic Acid, Sep. 2007, 7pages, Chemical Industry Press, Beijing.
Chinese Office Action dated Apr. 14, 2015.
European Extended Search Report dated Mar. 5, 2015.
Counterpart Office Action dated Mar. 29, 2016 issued by European Patent Office.

* cited by examiner

700

800

900

1000

1100

1200

1300

CHIP-INLAID FLOORING MATERIAL USING PLA RESIN

CROSS REFERENCE TO RELATED APPLICATION

This application is the National Phase application of International Application No. PCT/KR2011/004316 filed on Jun. 13, 2011, which designates the United States and was published in Korean.

TECHNICAL FIELD

Embodiments of the present invention relate to chip inlaid flooring materials using a PLA resin.

BACKGROUND ART

Flooring materials based on petroleum resins such as polyvinyl chloride (PVC) have mainly been used for buildings such as houses, apartments, offices, stores, and the like.

A polyvinyl chloride flooring material is manufactured through extrusion or calendering of resins, such as polyvinyl chloride. However, since polyvinyl chloride is a petroleum based product, severe supply problems may be encountered due to petroleum depletion.

In addition, since polyvinyl chloride flooring materials generate large amounts of toxic substances in use or disposal, it is necessary to suppress the use thereof as much as possible in terms of eco-friendliness.

Therefore, in recent years, flooring materials based on environmentally friendly resins have increasingly attracted attention as replacements for polyvinyl chloride based flooring materials.

However, typical eco-friendly flooring materials have insufficient strength, thereby providing demerits in formation or processing and gap widening upon heating in use.

DISCLOSURE

Technical Problem

One embodiment of the present invention provide a chip inlaid flooring material, which includes a chip inlaid layer formed using a PLA resin, thereby realizing an environmentally friendly flooring material.

Another embodiment of the present invention provides a chip inlaid flooring material using a PLA resin, which can secure dimensional stability through a dimension stabilizing layer of a glass fiber-impregnated structure upon heating.

A further embodiment of the present invention provides a chip inlaid flooring material using a PLA resin, which includes wood flour, chaff, pine resin, and the like in a chip inlaid layer and/or a base layer, thereby providing a natural texture which is difficult to realize in the related art.

Yet another embodiment of the present invention provides a chip inlaid flooring material using a PLA resin, which ensures rapid installation through a fabric layer formed on a rear side of the chip inlaid layer.

Technical Solution

In accordance with one aspect of the present invention, a chip inlaid flooring material using a PLA resin includes a chip inlaid layer, a dimension stabilizing layer, and a base layer, from the top of the flooring material, wherein at least one of the chip inlaid layer and the base layer includes a polylactic acid (PLA) resin as a binder.

In accordance with another aspect of the present invention, a chip inlaid flooring material using a PLA resin includes a chip inlaid layer and a base layer, from the top of the flooring material, wherein at least one of the chip inlaid layer and the base layer includes a PLA resin as a binder.

In accordance with a further aspect of the present invention, a chip inlaid flooring material using a PLA resin includes a chip inlaid layer and a fabric layer, from the top of the flooring material, wherein the chip inlaid layer includes a PLA resin as a binder.

Advantageous Effects

According to some embodiments of the present invention, the chip inlaid flooring material is provided with a chip inlaid layer formed of a PLA resin, thereby realizing an environmentally friendly flooring material.

According to some embodiments of the present invention, the chip inlaid flooring material can secure dimensional stability through a dimension stabilizing layer of a glass fiber-impregnated structure upon heating.

According to some embodiments of the present invention, the chip inlaid flooring material includes wood flour, chaff, pine resin, and the like in a chip inlaid layer and/or a base layer, thereby providing natural texture which is difficult to realize in the related art.

According to some embodiments of the present invention, the chip inlaid flooring material ensures rapid installation through a fabric layer formed on a rear side of the chip inlaid layer.

BEST MODE

Figure 1:
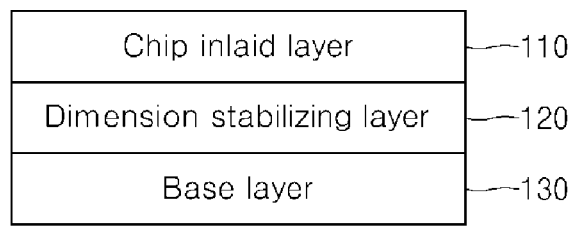
FIG. 1 is a sectional view of a chip inlaid flooring material using a PLA resin according to one embodiment of the present invention.

The above and other aspects, features, and advantages of the invention will become apparent from the detailed description of the following embodiments in conjunction with the accompanying drawings. It should be understood that the present invention is not limited to the following embodiments and may be embodied in different ways, and that the embodiments are provided to provide complete disclosure of the invention and a thorough understanding of the invention to those skilled in the art. The scope of the invention is defined only by the claims. Like components will be denoted by like reference numerals throughout the specification.

Polylactic acid (PLA) is a thermoplastic polyester of lactide or lactic acid, which can be prepared by polymerization of lactic acid obtained by fermentation of starch extracted from renewable plant resources, such as corn and potato. Such a PLA resin is an environmentally friendly material in that it discharges remarkably less toxic substances to the environment, for example, $CO_2$, in use or disposal than petroleum-based materials, for example, polyvinyl chloride (PVC), and thus has eco-friendly characteristics of ready biodegradation.

The PLA resin may be generally classified into D-PLA, L-PLA, D,L-PLA, meso-PLA, and the like. The PLA resin applied to flooring materials according to embodiments of the present invention may include any PLA resin used in the art, and may be used alone or in combination of two or more thereof.

As described above, the PLA resin may be prepared through polymerization of lactic acid or lactide, and, as needed, may be further copolymerized with a suitable copolymerizable component, which includes a glycol compound such as ethylene glycol or propylene glycol; dicarboxylic acid such as ethanedioic acid or terephthalic acid; hydroxycarbonic acid such as glycol acid and 2-hydroxy benzoic acid; lactones such as caprolactone or propiolactone, and the like.

The PLA resin may also be classified into a crystalline PLA (c-PLA) resin and an amorphous PLA (a-PLA) resin. Here, since the crystalline PLA resin can suffer from a bleeding phenomenon in which a plasticizer flows out of a sheet surface, the amorphous PLA resin is preferred. When the amorphous PLA resin is used, advantageously, a compatibilizer which has been essential to prevent the bleeding phenomenon may be omitted. When the amorphous PLA resin is used, it is most desirable that the PLA resin be composed of 100% of the amorphous PLA resin. Of course, a PLA resin composed of both the crystalline PLA resin and the amorphous PLA resin may also be used as needed.

A non-phthalate plasticizer softens the PLA resin to improve thermoplasticity, thereby facilitating molding at high temperature. Acetyl tributyl citrate (ATBC) may be used as the non-phthalate plasticizer.

Here, if the amount of the non-phthalate plasticizer is less than a reference amount based on 100 parts by weight of the PLA resin in the respective layers, hardness of the PLA resin can increase, thereby reducing processability. If the non-phthalate plasticizer is added in an amount exceeding the reference amount in the respective layers, compatibility with other components decreases, thereby deteriorating physical properties such as processibility.

An acrylic copolymer may be used as processing aids. Since the PLA resin has low melt strength or thermal resistance upon melt extrusion, the acrylic copolymer serves to improve melt strength of the PLA resin to secure processibility. Further, according to test results, the acrylic copolymer can be usefully applied to calendering and pressing of the PLA resin.

If the amount of the acrylic copolymer is less than a reference amount based on 100 parts by weight of the PLA resin, the PLA resin cannot secure sufficient improvement of melt efficiency and melt strength. If the amount of the acrylic copolymer exceeds the reference amount, manufacturing costs of the layers constituting the flooring material can increase and properties of the layers can be deteriorated due to low compatibility with other materials constituting the layers.

Although the weight average molecular weight of the acrylic copolymer is not particularly limited, the acrylic copolymer may have a weight average molecular weight ranging from 800,000 to 6,000,000 in consideration of improved melt strength and compatibility with other materials upon machining.

Further, the PLA resin may further include lubricants to prevent accumulation of deposits or crosslinked byproducts during melt extrusion.

Among various lubricants, embodiments of the present invention employ higher fatty acids, which are environmentally friendly lubricants. In particular, stearic acid corresponding to $C_{18}$ saturated high molecular weight fatty acid is used. These lubricants may be used alone or as mixtures thereof.

If the amount of the lubricant is less than a reference amount based on 100 parts by weight of the PLA resin, the effects of the lubricant cannot be obtained, and if the amount of the lubricant exceeds the reference amount, the PLA resin can be deteriorated in impact resistance, heat resistance, and gloss.

In order to prevent the PLA resin from being deteriorated in mechanical properties such as impact resistance through hydrolysis of the PLA resin, the PLA resin may further include an anti-hydrolysis agent. Examples of the anti-hydrolysis agent may include carbodiimide and oxazoline. However, it should be understood that any typical anti-hydrolysis agent may be used without limitation.

If the amount of the anti-hydrolysis agent exceeds a reference amount based on 100 parts by weight of the PLA resin, forming processibility can be lowered.

Next, chip inlaid flooring materials using a PLA resin according to embodiments of the present invention will be described in more detail.

Here, prior to the description of the embodiments of the present invention, it should be understood that a printed layer may be further added onto a chip inlaid layer and an intermediate layer having the same composition as a base layer may be interposed between the chip inlaid layer and the base layer. In addition, each of the base layer and the chip inlaid layer may be composed of two or more layers, and a fabric layer may be formed as the lowermost layer of the flooring material. Further, although not shown in the drawings, the flooring material may optionally have a surface treatment layer at the uppermost side thereof. The flooring material may omit the surface treatment layer as shown in the drawings.

For reference, the surface treatment layer may be formed in order to improve surface quality of the flooring material, such as scratch resistance and wear resistance while improving anti-contamination to facilitate cleaning of the flooring material.

The surface treatment layer may be formed in various ways. For example, a general UV-curable acrylate composition such as a UV-curable urethane acrylate composition may be coated on wood chip layers 200, 201, 202, 204, 205 and cured via UV radiation. Alternatively, thermosetting wax may be coated thereon and cured in an oven. The surface treatment layer may be formed of a material selected from polyurethane, urethane acrylate, wax, and the like.

The surface treatment layer may have a thickness of 0.001 mm to 0.1 mm. If the thickness of the surface treatment layer is less than 0.001 mm, it is difficult to improve physical properties such as scratch resistance, and if the thickness of the surface treatment layer exceeds 0.1 mm, excessive manufacturing costs are required to form the surface treatment layer, and an outer appearance of the flooring material can be lowered.

FIG. 1 is a sectional view of a chip inlaid flooring material using a PLA resin according to one embodiment of the present invention.

Referring to FIG. 1, the chip inlaid flooring material 100 according to one embodiment includes a chip inlaid layer 110, a dimension stabilizing layer 120, and a base layer 130 stacked in this order from the top thereof.

Each of the layers may have a multilayer structure as needed, and although not shown in the drawings, an intermediate layer may be interposed between the chip inlaid layer 110 and the dimension stabilizing layer 120. The intermediate layer may have the same composition as that of the base layer 130.

The chip inlaid layer 110 may have a chip shape having an appearance of natural marble. Such a chip inlaid layer 110 may be formed in various shapes. First, the chip inlaid layer 110 may be formed as a PLA resin layer, which includes PLA resin chips or additional chips such as aromatic chips. Alternatively, instead of including the additional chips, the chip inlaid layer 110 may be formed as a PLA resin layer containing wood flour or the like as chips, such that it appears that the chips exist inside when they are viewed from the surface of the flooring material. Alternatively, the chip inlaid layer 110 may be formed on a separate PLA resin layer by preparing a PLA resin sheet, pulverizing the PLA resin sheet, and arranging the pulverized PLA resin sheet particles on the separate PLA resin layer.

Here, the term "chips" refer to particles obtained by pressing a mixture of the PLA resin with pigments and the like to form a sheet, and pulverizing the sheet into particles having a size of 0.5 mm to 20 mm using a pulverizer.

The chip inlaid layer 110 includes a PLA (polylactic acid) resin as a binder. The chip inlaid layer 110 may further include at least one of acetyl tributyl citrate (ATBC) as a non-phthalate plasticizer, and an acrylic copolymer as processing aids and an anti-hydrolysis agent.

The chip inlaid layer 110 may include at least one of 5 to 100 parts by weight of the non-phthalate plasticizer, 0.1 to 20 parts by weight of the acrylic copolymer, 0.01 to 10 parts by weight of at least one of stearic acid and higher fatty acids as lubricants, 0.01 to 10 parts by weight of an acrylic resin, 10 parts by weight or less of an anti-hydrolysis agent, 200 parts by weight or less of at least one of wood flour and chaff, 500 parts by weight or less of calcium carbonate ($CaCO_3$), 50 parts by weight or less of titanium dioxide ($TiO_2$), and 20 parts by weight or less of pine resin, based on 100 parts by weight of the PLA resin.

Here, the acrylic copolymer may be present in an amount of 0.1 to 20 parts by weight based on 100 parts by weight of the PLA resin in the chip inlaid layer 110.

The acrylic resin may be present in an amount of 0.01 to 10 parts by weight based on 100 parts by weight of the PLA resin in the chip inlaid layer 110.

The lubricants may be present in an amount of 0.01 to 10 parts by weight based on 100 parts by weight of the PLA resin in the chip inlaid layer 110.

The anti-hydrolysis agent may be present in an amount of 10 parts by weight or less based on 100 parts by weight of the PLA resin in the chip inlaid layer 110.

The chip inlaid layer 110 may further include calcium carbonate ($CaCO_3$) as inorganic fillers for reinforcement or titanium dioxide ($TiO_2$) as a white pigment for imparting an aesthetically pleasing appearance, and may further include at least one of wood flour and chaff, and pine resin to impart a texture of natural wood and inherent fragrance of wood.

The calcium carbonate may be present in an amount of 500 parts by weight or less based on 100 parts by weight of the PLA resin in the chip inlaid layer 110. Further, the titanium dioxide may be present in an amount of 50 parts by weight or less based on 100 parts by weight of the PLA resin in the chip inlaid layer 110.

The wood flour or chaff may be present in an amount of 200 parts by weight or less based on 100 parts by weight of the PLA resin in the chip inlaid layer 110, and the pine resin may be present in an amount of 20 parts by weight or less based on 100 parts by weight of the PLA resin in the chip inlaid layer 110.

Within this range, as much of the wood flour, chaff, or pine resin may be added to the chip inlaid layer 110 as possible to impart visibility, texture of natural wood, fragrance of wood, and the like. However, if the amount of the wood flour, chaff, or pine resin exceeds the corresponding reference range, bonding force between other components can be lowered, thereby deteriorating overall processibility of the PLA resin.

The chip inlaid layer 110 may have a thickness of 0.3 mm to 3.0 mm.

The dimension stabilizing layer 120 serves to enhance dimensional stability of the PLA resin. The flooring material using the PLA resin can undergo dimensional variation due to temperature change by heating, such that a connecting part between the flooring materials can widen due to contraction. The dimension stabilizing layer 120 may prevent such a phenomenon by securing dimensional stability.

The dimension stabilizing layer 120 has a glass fiber-impregnated structure. Specifically, in the dimension stabilizing layer 120, glass fiber is impregnated into at least one of acrylic resins, melamine resins and PLA resins.

Here, the glass fiber may have a mass per unit area of 30 $g/m^2$ to 150 $g/m^2$. If the mass per unit area of the glass fiber is less than 30 $g/m^2$, insufficient dimensional stability is obtained, and if the mass per unit area of the glass fiber exceeds 150 $g/m^2$, adhesion between the chip inlaid layer 110 and the dimension stabilizing layer 120 is lowered.

The dimension stabilizing layer 120 may further include one of at least two of plasticizers including a citric acid plasticizer such as ATBC, a phthalate plasticizer such as DINP, a phosphate plasticizer, and the like; a viscosity depressant; calcium carbonate as inorganic fillers for cost reduction; titanium dioxide ($TiO_2$) as a white pigment, and a combination thereof according to the purpose or shape thereof.

The dimension stabilizing layer 120 may include 40 to 150 parts by weight of ATBC, 30 parts by weight or less of the viscosity depressant, 150 parts by weight or less of calcium carbonate, and 20 parts by weight or less of titanium dioxide, based on 100 parts by weight of the acrylic resin.

If the dimension stabilizing layer 120 contains less than 40 parts by weight of ATBC based on 100 parts by weight of the acrylic resin, the dimension stabilizing layer 120 can have low hardness, and if the dimension stabilizing layer 120 contains more than 150 parts by weight of the plasticizer, dimensional stability can be deteriorated due to low compatibility with other components.

If the dimension stabilizing layer 120 contains more than 30 parts by weight of the viscosity depressant based on 100 parts by weight of the acryl resin, formability can be lowered due to excessive decrease in viscosity. If the amounts of calcium carbonate and titanium dioxide exceed the above ranges, bonding force with other components can be lowered, thereby causing deterioration in processibility.

The dimension stabilizing layer 120 may have a thickness of 0.1 mm to 1.0 mm. If the thickness of the dimension stabilizing layer 120 is less than 0.1 mm, insufficient dimensional stability can be obtained, and if the thickness of the dimension stabilizing layer 120 exceeds 1.0 mm, only the thickness of the dimension stabilizing layer increases without providing dimensional stability, thereby causing increase in overall manufacturing costs.

The base layer 130 is the most basic layer of the flooring material, and serves to support the dimension stabilizing layer 120 and the chip inlaid layer 110 at an upper side of the flooring material while absorbing impact exerted upon the upper or lower side thereof.

The base layer 130 may include a PLA resin as a binder, ATBC as a non-phthalate plasticizer, and an acrylic copolymer as a melt strength enhancer.

The base layer 130 may include 5 to 100 parts by weight of the non-phthalate plasticizer and 0.1 to 20 parts by weight of the melt strength enhancer based on 100 parts by weight of the PLA resin.

The base layer 130 may further include at least one of 0.01 to 10 parts by weight of a higher fatty acid as a lubricant, 0.01 to 10 parts by weight of a chain extender, 10 parts by weight or less of an anti-hydrolysis agent, 1,000 parts by weight or less of calcium carbonate ($CaCO_3$), 200 parts by weight or less of wood flour, 50 parts by weight or less of titanium dioxide ($TiO_2$), and 20 parts by weight or less of pine resin, based on 100 parts by weight of the PLA resin.

The base layer 130 may have a thickness of 1.00 mm to 5.0 mm. If the thickness of the base layer 130 is less than 1.0 mm, the base layer does not function properly, and if the thickness of the base layer 130 exceeds 5.0 mm, the manufacturing costs of the flooring material can be increased due to use of a large amount of the PLA resin.

Figure 2:
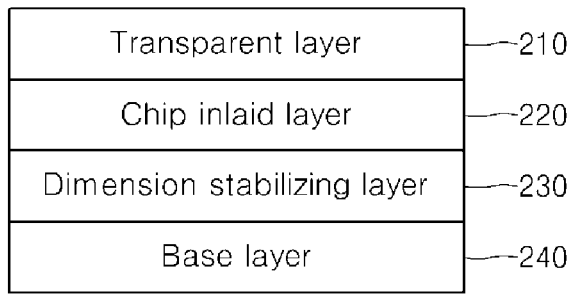
FIG. 2 is a sectional view of a chip inlaid flooring material using a PLA resin according to another embodiment of the present invention.

FIG. 2 is a sectional view of a chip inlaid flooring material using a PLA resin according to another embodiment of the present invention.

Referring to FIG. 2, the chip inlaid flooring material 200 using a PLA resin according to this embodiment includes a transparent layer 210, a chip inlaid layer 220, a dimension stabilizing layer 230, and a base layer 240 stacked in this order from the top thereof.

The chip inlaid flooring material 200 has the same components as those of the chip inlaid flooring material 100 of FIG. 1 except for the transparent layer 210. Accordingly, descriptions of the chip inlaid layer 220, the dimension stabilizing layer 230, and the base layer 240 will be omitted herein, and the transparent layer 210 will be focused upon.

The transparent layer 210 is formed on the chip inlaid layer 220 to provide a volumetric appearance to the flooring material while protecting the pattern formed on the chip inlaid layer 220.

The transparent layer 210 may include an acrylic resin, a PLA resin, and the like as a binder system. That is, the transparent layer 210 may include at least one of the acrylic resin and the PLA resin; at least one of a non-phthalate as a first plasticizer; an acrylic copolymer as processing aids and an anti-hydrolysis agent.

The transparent layer 210 may include at lease one of 5 to 50 parts by weight of the non-phthalate plasticizer, 0.1 to 20 parts by weight of the acrylic copolymer, 0.01 to 10 parts by weight of at least one of stearic acid and higher fatty acids as lubricants, and 10 parts by weight or less of an anti-hydrolysis agent, based on 100 parts by weight of the acrylic resin.

The transparent layer 210 may have a thickness of 0.1 mm to 1.0 mm. If the thickness of the transparent layer 210 is less than 0.1 mm, it is difficult to protect the pattern formed on the printed pattern directly under the transparent layer 210, and if the thickness of the transparent layer 210 exceeds 1.0 mm, the overall manufacturing costs of the flooring material can be increased.

Figure 3:
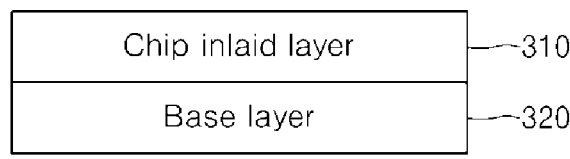
FIG. 3 is a sectional view of a chip inlaid flooring material using a PLA resin according to a further embodiment of the present invention.

FIG. 3 is a sectional view of a chip inlaid flooring material using a PLA resin according to a further embodiment of the present invention.

Referring to FIG. 3, a chip inlaid flooring material 300 using a PLA resin according to this embodiment includes a chip inlaid layer 310, and a base layer 320 stacked in this order from the top thereof.

The chip inlaid layer 310 may have a chip shape having an appearance of natural marble and be constituted by two or more layers as needed.

The chip inlaid layer 310 may include at least one of a PLA resin as a binder, a non-phthalate plasticizer, an acrylic copolymer as processing aids and an anti-hydrolysis agent.

The chip inlaid layer 310 may include at least one of 5 to 100 parts by weight of the non-phthalate plasticizer, 0.1 to 20 parts by weight of the acrylic copolymer, 10 parts by weight or less of an anti-hydrolysis agent, 200 parts by weight or less of at least one of wood flour and chaff, 500 parts by weight or less of calcium carbonate ($CaCO_3$), 50 parts by weight or less of titanium dioxide ($TiO_2$), and 20 parts by weight or less of pine resin, based on 100 parts by weight of the PLA resin.

The chip inlaid layer 310 may have a thickness of 0.3 mm to 3.0 mm. If the chicness of the chip inlaid layer 310 is less than 0.3 mm, the chip inlaid layer 310 does not function properly, and if the thickness of the chip inlaid layer 310 exceeds 3.0 mm, the manufacturing costs of the flooring material can be increased due to use of a large amount of the PLA resin.

The base layer 320 is the most basic layer of the flooring material, and serves to support the chip inlaid layer 310 at an upper side of the flooring material while absorbing impact exerted upon the upper or lower side thereof.

The base layer 320 may include a PLA resin as a binder, a non-phthalate plasticizer, and an acrylic copolymer as a melt strength enhancer.

The base layer 320 may include 5 to 100 parts by weight of the non-phthalate plasticizer and 0.1 to 20 parts by weight of the melt strength enhancer based on 100 parts by weight of the PLA resin.

The base layer 320 may further include at least one of 0.01 to 10 parts by weight of a high molecular weight fatty acid as a lubricant, 0.01 to 10 parts by weight of a chain extender, 10 parts by weight or less of an anti-hydrolysis agent, 1,000 parts by weight or less of calcium carbonate ($CaCO_3$), 200 parts by weight or less of wood flour, 50 parts by weight or less of titanium dioxide ($TiO_2$), and 20 parts by weight or less of pine resin, based on 100 parts by weight of the PLA resin.

The base layer 320 may have a thickness of 1.00 mm to 5.0 mm. If the thickness of the base layer 320 is less than 1.0 mm, the base layer 320 does not function properly, and if the thickness of the base layer 320 exceeds 5.0 mm, the manufacturing costs of the flooring material can be increased due to use of a large amount of the PLA resin.

Figure 4:
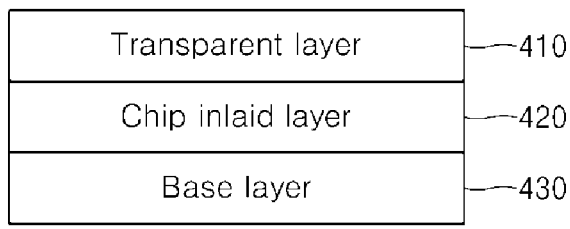
FIG. 4 is a sectional view of a chip inlaid flooring material using a PLA resin according to a yet another embodiment of the present invention.

FIG. 4 is a sectional view of a chip inlaid flooring material using a PLA resin according to yet another embodiment of the present invention.

Referring to FIG. 4, a chip inlaid flooring material 400 using a PLA resin according to this embodiment includes a transparent layer 410, a chip inlaid layer 420, and a base layer 430 stacked in this order from the top thereof.

The chip inlaid flooring material 400 has the same components as those of the chip inlaid flooring material 300 of FIG. 3 except for the transparent layer 410. Accordingly, descriptions of the chip inlaid layer 420 and the base layer 430 will be omitted, and the transparent layer 410 will be mainly described herein.

The transparent layer 410 is formed on the chip inlaid layer 420 to provide a volumetric appearance to the flooring material while protecting the pattern formed on the chip inlaid layer 420.

The transparent layer 410 may include and at least one of a PLA resin as a binder, ATBC as a non-phthalate plasticizer, an acrylic copolymer as processing aids and an anti-hydrolysis agent.

The transparent layer 410 may include 5 to 50 parts by weight of the non-phthalate plasticizer, 0.1 to 20 parts by weight of the acrylic copolymer, 0.01 to 10 parts by weight of at least one of stearic acid and higher fatty acids as lubricants, 0.01 to 10 parts by weight of an acrylic resin, and 10 parts by weight or less of an anti-hydrolysis agent, based on 100 parts by weight of the PLA resin.

The transparent layer 410 may have a thickness of 0.1 mm to 1.0 mm. If the thickness of the transparent layer 410 is less than 0.1 mm, it is difficult to protect the pattern formed on the printed pattern under the transparent layer 410, and if the thickness of the transparent layer 410 exceeds 1.0 mm, the overall manufacturing costs of the flooring material can be increased.

The detailed configuration of the transparent layer 410 is the same as the transparent layer 210 of FIG. 2.

Figure 5:
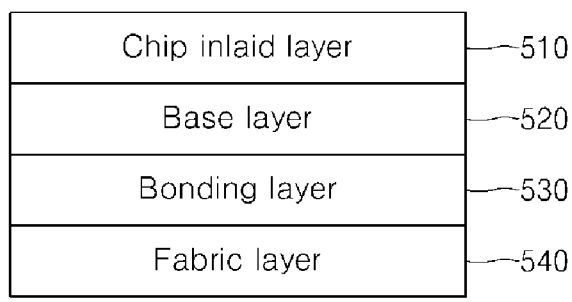
FIG. 5 is a sectional view of a chip inlaid flooring material using a PLA resin according to a yet another embodiment of the present invention.

FIG. 5 is a sectional view of a chip inlaid flooring material using a PLA resin according to yet another further embodiment of the present invention.

Referring to FIG. 5, the chip inlaid flooring material 500 using a PLA resin according to this embodiment includes a chip inlaid layer 510, a base layer 520, an bonding layer 530, and a fabric layer 540 stacked in this order from the top thereof.

The chip inlaid flooring material 500 has the same components as those of the chip inlaid flooring material 300 of FIG. 3 except for the bonding layer 530 and the fabric layer 540. Accordingly, descriptions of the chip inlaid layer 510 and the base layer 520 will be omitted, and the bonding layer 530 and the fabric layer 540 will be mainly described herein.

The bonding layer 530 may be may be formed of at least one material selected from vinyl acetate adhesive resins, ethylene vinyl acetate (EVA) adhesive resins, urethane adhesive resin, mixtures of urethane adhesive resins and isocyanate curing agents, acrylic adhesive resins, and mixtures of acrylic adhesive resins and epoxy curing agents.

The bonding layer 530 may be formed on the base layer 520 by depositing a selected adhesive resin on the backside (lower side) of the base layer 520 by comma coating, knife coating, and the like, followed by drying in an oven. At this time, drying in the oven may be performed in a temperature range from 50° C. to 300° C. Particularly, when the bonding layer 530 is formed between the fabric layer 540 and the base layer 520, it may be formed at a temperature of 100° C. to 200° C. under a pressure of 1~10 kgf/cm².

The fabric layer 540 may include at least one of jute, white hemp, cotton, and polyester. Such a fabric layer 540 is composed of fabrics, and the fabrics for the fabric layer may include T/C plain weave fabrics or knitted fabrics. The fabrics may be prepared from yarns such as 100% cotton, polyester, polyester mixed with nylon, and the like.

Figure 6:
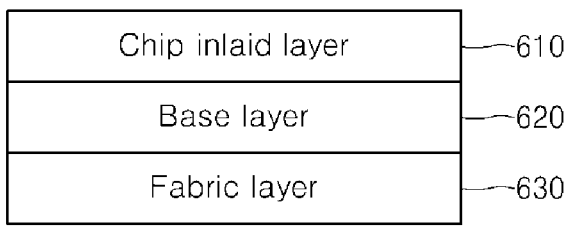
FIG. 6 is a sectional view of a chip inlaid flooring material using a PLA resin according to a yet another embodiment of the present invention.

FIG. 6 is a sectional view of a chip inlaid flooring material using a PLA resin according to yet another embodiment of the present invention.

Referring to FIG. 6, a chip inlaid flooring material 600 using a PLA resin according to this embodiment includes a chip inlaid layer 610, a base layer 620, and a fabric layer 630 stacked in this order from the top thereof.

The chip inlaid layer 610, the base layer 620, and the fabric layer 630 are the same as those of the flooring material of FIG. 5 in terms of composition and preparation. Thus, descriptions thereof will be omitted herein.

Figure 7:
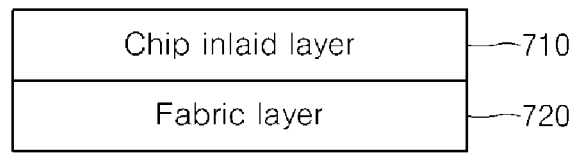
FIG. 7 is a sectional view of a chip inlaid flooring material using a PLA resin according to a yet another embodiment of the present invention.

FIG. 7 is a sectional view of a chip inlaid flooring material using a PLA resin according to yet another embodiment of the present invention.

Referring to FIG. 7, the chip inlaid flooring material 700 using a PLA resin according to this embodiment includes a chip inlaid layer 710 and a fabric layer 720 stacked in this order from the top thereof.

The chip inlaid layer 710 and the fabric layer 720 are the same as those of the flooring material of FIG. 6 in terms of composition and preparation. Thus, descriptions thereof will be omitted herein.

Figure 8:
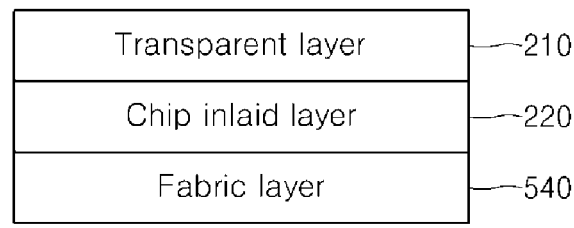
FIG. 8 is a sectional view of a chip inlaid flooring material using a PLA resin according to a yet another embodiment of the present invention.

FIG. 8 is a sectional view of a chip inlaid flooring material using a PLA resin according to yet another embodiment of the present invention.

Referring to FIG. 8, a chip inlaid flooring material 800 using a PLA resin according to this embodiment includes a transparent layer 210, a chip inlaid layer 220, and a fabric layer 540 stacked in this order from the top thereof.

The transparent layer 210 and the chip inlaid layer 220 are the same as those of the flooring material of FIG. 2 in terms of composition and preparation. In addition, the fabric layer 540 is the same as that of the flooring material of FIG. 5 in terms of composition and preparation. Thus, descriptions thereof will be omitted herein.

Figure 9:
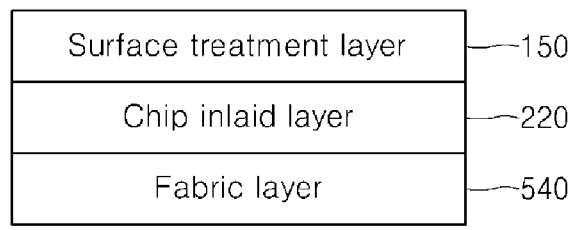
FIG. 9 is a sectional view of a chip inlaid flooring material using a PLA resin according to a yet another embodiment of the present invention.

FIG. 9 is a sectional view of a chip inlaid flooring material using a PLA resin according to a further embodiment of the present invention.

Referring to FIG. 9, a chip inlaid flooring material 900 using a PLA resin according to this embodiment includes a surface treatment layer 150, a chip inlaid layer 220, and a fabric layer 540 stacked in this order from the top thereof.

The chip inlaid layer 220 and the fabric layer 540 are the same as those of the flooring materials of FIGS. 2 and 5, respectively, in terms of composition and preparation. Thus, descriptions of these components will be omitted and the surface treatment layer 150 will be mainly described herein.

The surface treatment layer 150 may be formed on the chip inlaid layer 220 and include polyurethane, urethane acrylate, wax, and the like. The surface treatment layer 150 may be formed in various ways. For example, a general UV curable composition such as UV-curable urethane acrylate compositions may be coated on the chip inlaid layer 220 and cured by UV radiation. Alternatively, thermosetting wax is deposited thereon and cured in an oven to form the surface treatment layer.

The surface treatment layer 150 may have a thickness of 0.001 mm to 0.1 mm. If the thickness of the surface treatment layer 150 is less than 0.001 mm, it is difficult to improve physical properties such as scratch resistance, and if the thickness of the surface treatment layer exceeds 0.1 mm, excessive manufacturing costs are required to form the surface treatment layer 150, and an outer appearance of the flooring material can be deteriorated.

Figure 10:
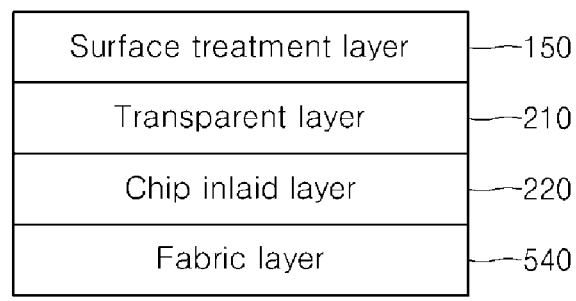
FIG. 10 is a sectional view of a chip inlaid flooring material using a PLA resin according to a yet another embodiment of the present invention.

FIG. 10 is a sectional view of a chip inlaid flooring material using a PLA resin according to yet another embodiment of the present invention.

Referring to FIG. 10, a chip inlaid flooring material 1000 using a PLA resin according to this embodiment includes a surface treatment layer 150, a transparent layer 210, a chip inlaid layer 220, and a fabric layer 540 stacked in this order from the top thereof.

The surface treatment layer 150 is the same as that of the flooring material of FIG. 9; the transparent layer 210 and the chip inlaid layer 220 are the same as those of the flooring material of FIG. 2, and the fabric layer 540 is the same as that of the flooring material of FIG. 5. Thus, a detailed description of these components will be omitted herein.

Figure 11:
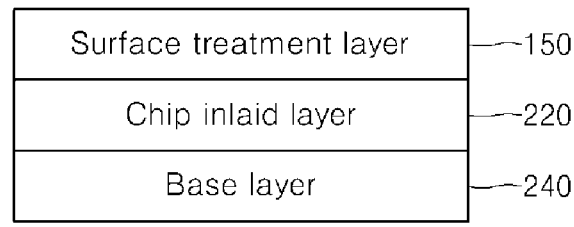
FIG. 11 is a sectional view of a chip inlaid flooring material using a PLA resin according to a yet another embodiment of the present invention.

FIG. 11 is a sectional view of a chip inlaid flooring material using a PLA resin according to yet another embodiment of the present invention.

Referring to FIG. 11, a chip inlaid flooring material 1100 using a PLA resin according to this embodiment includes a surface treatment layer 150, a chip inlaid layer 220, and a base layer 240 stacked in this order from the top thereof.

The surface treatment layer 150 is the same as that of the flooring material of FIG. 9, and the chip inlaid layer 220 and the base layer 240 are the same as those of the flooring material of FIG. 2. Thus, detailed description of these components will be omitted herein.

Figure 12:
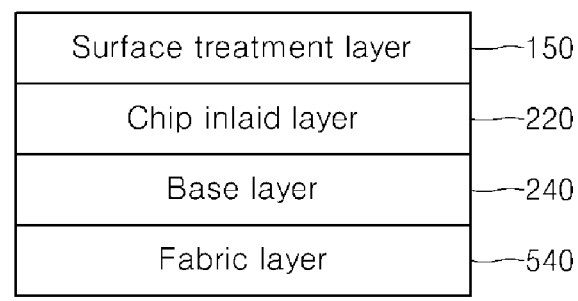
FIG. 12 is a sectional view of a chip inlaid flooring material using a PLA resin according to a yet another embodiment of the present invention.

FIG. 12 is a sectional view of a chip inlaid flooring material using a PLA resin according to yet another embodiment of the present invention.

Referring to FIG. 12, a chip inlaid flooring material 1200 using a PLA resin according to this embodiment includes a surface treatment layer 150, a chip inlaid layer 220, a base layer 240, and a fabric layer 540 stacked in this order from the top thereof.

The surface treatment layer 150 is the same as that of the flooring material of FIG. 9; the chip inlaid layer 220 and the base layer 240 are the same as those of the flooring material of FIG. 2; and the fabric layer 540 is the same as that of the flooring material of FIG. 5. Thus, detailed description of these components will be omitted herein.

Figure 13:
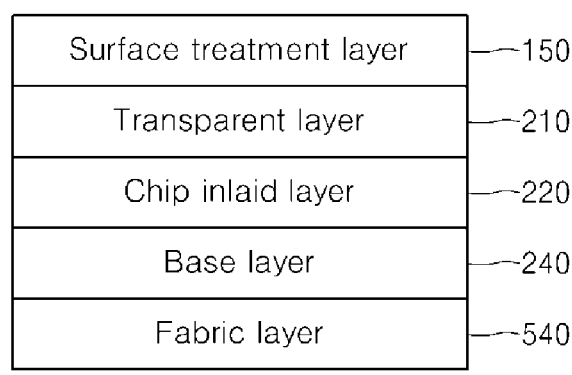
FIG. 13 is a sectional view of a chip inlaid flooring material using a PLA resin according to a yet another embodiment of the present invention.

FIG. 13 is a sectional view of a chip inlaid flooring material using a PLA resin according to a further embodiment of the present invention.

Referring to FIG. 13, a chip inlaid flooring material 1300 using a PLA resin according to this embodiment includes a surface treatment layer 150, a transparent layer 210, a chip inlaid layer 220, a base layer 240, and a fabric layer 540 stacked in this order from the top thereof.

The surface treatment layer 150 the same as that of the flooring material of FIG. 9; the transparent layer 210, the chip inlaid layer 220 and the base layer 240 are the same as those of the flooring material of FIG. 2; and the fabric layer 540 is the same as that of the flooring material of FIG. 5. Thus, detailed description of these components will be omitted herein.

Preparative Example

Next, the present invention will be described in detail with reference to some examples of the chip inlaid flooring materials using a PLA resin according to the embodiments of the present invention. These examples are provided for illustration only and are not to be in any way construed as limiting the present invention.

A description of details apparent to those skilled in the art will be omitted herein.

Preparation of Transparent Layer 100 parts by weight of a PLA resin (2002D, melt index of less than 3, Nature Works Co., Ltd.), 20 parts by weight of ATBC, 10 parts by weight of ESO, 10 parts by weight of an acrylic copolymer (PA828, LG Chemistry Co., Ltd.), 5 parts by weight of stearic acid, 5 parts by weight of an acrylic resin, and 5 parts by weight of carbodiimide were placed in an extruder and subjected to primary kneading, and then kneaded using a Banbury mixer at 160° C., followed by primary and secondary mixing using a 2-roll mixer at 160° C. Then, the prepared mixture was subjected to calendering at 130° C. to form a sheet having a thickness of about 0.6 mm.

Preparation of Chip Inlaid Layer

A 1 mm thick sheet was prepared using a mixture of 100 parts by weight of a PLA resin (2002D, melt index of less than 3, Nature Works Co., Ltd.), 40 parts by weight of ATBC, 10 parts by weight of ESO, 10 parts by weight of an acrylic copolymer (PA828, LG Chemistry Co., Ltd.), 5 parts by weight of stearic acid, 5 parts by weight of carbodiimide, 100 parts by weight of wood flour, 280 parts by weight of calcium carbonate, 20 parts by weight of titanium dioxide and 10 parts by weight of pine resin. Then, the prepared sheet was pulverized and pressed at 150° C. to form a sheet having a thickness of about 1.5 mm.

Preparation of Dimension Stabilizing Layer 100 parts by weight of an acrylic resin, 60 parts by weight of ATBC, 15 parts by weight of a viscosity depressant, 50 parts by weight of calcium carbonate, and 5 parts by weight of titanium dioxide were mixed to prepare an acrylic sol. Then, the prepared acrylic sol was impregnated into glass fiber (60 g/m$^2$) using a roll coater, followed by drying at 180° C. for 3 minutes, thereby preparing a 0.4 mm thick dimension stabilizing layer.

Preparation of Intermediate Layer and Base Layer

Through the same process as the process of preparing the transparent layer, a 2 mm thick sheet was prepared using a mixture of 100 parts by weight of a PLA resin 2002D, 30 parts by weight of ATBC, 15 parts by weight of ESO, 10 parts by weight of an acrylic copolymer, 5 parts by weight of stearic acid, 5 parts by weight of diisocyanate, 5 parts by weight of carbodiimide, 300 parts by weight of calcium carbonate, 100 parts by weight of wood flour, 20 parts by weight of titanium dioxide, and 10 parts by weight of pine resin.

Preparation of Surface Treatment Layer

The surface treatment layer may be formed in various ways, for example, by depositing a general UV curable composition such as a UV curable urethane acrylate composition on the chip inlaid layer, followed by curing by UV radiation, or by depositing thermosetting wax thereon and curing in an oven. The surface treatment may be formed of a resin selected from polyurethane, urethane acrylate, and wax. With this method, a 0.1 mm thick surface treatment layer was prepared.

Although some embodiments have been described with reference to the accompanying drawing, it will be understood by those skilled in the art that these embodiments are provided for illustrative purposes only, and various modifications, changes, alterations and equivalent embodiments can be made without departing from the scope of the present invention. Therefore, the scope and sprit of the present invention should be defined only by the accompanying claims and equivalents thereof.

The invention claimed is:

1. A chip inlaid flooring material using a PLA resin, comprising:
   a chip inlaid layer; and a base layer, from the top of the flooring material,
   wherein at least one of the chip inlaid layer and the base layer comprises a polylactic acid (PLA) resin as a binder;
   wherein the chip inlaid flooring material further comprises a fabric layer on a rear side of the base layer, wherein the fabric layer comprises at least one of jute, white hemp, cotton, and polyester;
   wherein the chip inlaid flooring material further comprises a dimension stabilizing layer between the chip inlaid layer and the base layer, wherein the dimension stabilizing layer comprises glass fiber impregnated into at least one of an acrylic resin, a melamine resin or a PLA resin;
   wherein the base layer further comprises a non-phthalate plasticizer, and an acrylic copolymer as a melt strength enhancer;
   wherein the PLA resin comprises an amorphous PLA resin or a mixture of crystalline PLA resin and amorphous PLA resin; and
   wherein the chip inlaid layer comprises 100 to 200 parts by weight of at least one selected from the group consisting of wood flour and chaff, and 10 to 20 parts by weight of pine resin, based on 100 parts by weight of the PLA resin.

2. The chip inlaid flooring material according to claim 1, further comprising:
   a surface treatment layer on a surface of the chip inlaid layer, the surface treatment layer comprising polyurethane, urethane acrylate, or wax.

3. The chip inlaid flooring material according to claim 1, further comprising:
   a bonding layer between the base layer and the fabric layer.

4. The chip inlaid flooring material according to claim 1, wherein the chip inlaid layer has a thickness of 0.3 mm to 3.0 mm.

5. The chip inlaid flooring material according to claim 1, wherein the chip inlaid layer further comprises at least one of a non-phthalate plasticizer, an acrylic copolymer as processing aids in the PLA resin and an anti-hydrolysis agent in addition to the PLA resin.

6. The chip inlaid flooring material according to claim 5, wherein the acrylic copolymer has a weight average molecular weight (Mw) ranging from 800,000 to 6,000,000.

7. The chip inlaid flooring material according to claim 5, wherein the anti-hydrolysis agent comprises carbodiimide or oxazoline.

8. The chip inlaid flooring material according to claim 5, wherein the chip inlaid layer further comprises at least one of 5 to 100 parts by weight of the non-phthalate plasticizer, 0.1 to 20 parts by weight of the acrylic copolymer, 0.01 to 10 parts by weight of at least one of stearic acid and higher fatty acids as lubricants, 0.01 to 10 parts by weight of an acrylic resin, 10 parts by weight or less of the anti-hydrolysis agent, 500 parts by weight or less of calcium carbonate ($CaCO_3$), and 50 parts by weight or less of titanium dioxide ($TiO_2$), based on 100 parts by weight of the PLA resin.

9. The chip inlaid flooring material according to claim 1, further comprising: a transparent layer on the chip inlaid layer.

10. The chip inlaid flooring material according to claim 9, further comprising: a surface treatment layer formed on the transparent layer, the surface treatment layer comprising polyurethane, urethane acrylate, or wax.

11. The chip inlaid flooring material according to claim 9, wherein the transparent layer comprises a PLA resin or an acrylic resin as a binder.

12. The chip inlaid flooring material according to claim 11, wherein the transparent layer further comprises at least one of ATBC as a non-phthalate plasticizer, an acrylic copolymer as processing aids and an anti-hydrolysis agent in the PLA resin or the acrylic resin.

13. A chip inlaid flooring material using a PLA resin, comprising a chip inlaid layer and a fabric layer from the top of the flooring material,
   wherein the chip inlaid layer comprises a PLA resin as a binder and a plurality of chips dispersed therein;
   wherein the chip inlaid flooring material further comprises a fabric layer on a rear side of the base layer, wherein the fabric layer comprises at least one of jute, white hemp, cotton, and polyester;
   wherein the chip inlaid flooring material further comprises a dimension stabilizing layer between the chip inlaid layer and the base layer, wherein the dimension stabilizing layer comprises glass fiber impregnated into at least one of an acrylic resin, a melamine resin or a PLA resin;
   wherein the base layer further comprises a non-phthalate plasticizer, and an acrylic copolymer as a melt strength enhancer;
   wherein the PLA resin comprises an amorphous PLA resin or a mixture of crystalline PLA resin and amorphous PLA resin; and
   wherein the chip inlaid layer comprises 100 to 200 parts by weight of at least one selected from the group consisting of wood flour and chaff, and 10 to 20 parts by weight of pine resin, based on 100 parts by weight of the PLA resin.

14. The chip inlaid flooring material according to claim 13, further comprising: a transparent layer formed on the chip inlaid layer.

15. The chip inlaid flooring material according to claim 14, further comprising: a surface treatment layer formed on the transparent layer or the chip inlaid layer, the surface treatment layer comprising polyurethane, urethane acrylate, or wax.

* * * * *